(12) United States Patent
Gawthrop

(10) Patent No.: US 9,365,090 B2
(45) Date of Patent: Jun. 14, 2016

(54) CLIMATE CONTROL SYSTEM FOR VEHICLES USING THERMOELECTRIC DEVICES

(71) Applicant: Gentherm Incorporated, Northville, MI (US)

(72) Inventor: Peter R. Gawthrop, Troy, MI (US)

(73) Assignee: Gentherm Incorporated, Northville, MI (US)

( * ) Notice: Subject to any disclaimer, the term of this patent is extended or adjusted under 35 U.S.C. 154(b) by 380 days.

(21) Appl. No.: 13/966,106

(22) Filed: Aug. 13, 2013

(65) Prior Publication Data

US 2013/0327063 A1 Dec. 12, 2013

Related U.S. Application Data

(60) Continuation of application No. 13/007,454, filed on Jan. 14, 2011, now abandoned, which is a continuation of application No. 12/131,853, filed on Jun. 2, 2008, now Pat. No. 7,870,892, which is a division of application No. 10/842,109, filed on May 10, 2004, now Pat. No. 7,380,586.

(51) Int. Cl.
*B60H 1/00* (2006.01)
*F25B 21/04* (2006.01)
*B60H 1/22* (2006.01)

(52) U.S. Cl.
CPC ............. *B60H 1/00007* (2013.01); *B60H 1/004* (2013.01); *B60H 1/00478* (2013.01); *F25B 21/04* (2013.01); *B60H 2001/2234* (2013.01); *B60H 2001/2237* (2013.01)

(58) Field of Classification Search
CPC ............... B60H 1/00007; B60H 1/004; B60H 1/00478; B60H 1/034; B60H 2001/2234; B60H 2001/2237; F25B 21/04; F25B 21/02
See application file for complete search history.

(56) References Cited

U.S. PATENT DOCUMENTS

| 413,136 A | 10/1889 | Dewey |
| 2,362,259 A | 11/1944 | Findley |
| 2,363,168 A | 11/1944 | Findley |

(Continued)

FOREIGN PATENT DOCUMENTS

| CN | 1195090 | 10/1998 |
| CN | 1236429 A | 11/1999 |

(Continued)

OTHER PUBLICATIONS

Heckenberger, Thomas, "Li-on Battery Cooling," BEHR Power Point Presentation, Technical Press Day, Stuttgart, May 20, 2009, 13 pages.

(Continued)

*Primary Examiner* — Marc Norman
*Assistant Examiner* — Jon T Schermerhorn
(74) *Attorney, Agent, or Firm* — Knobbe, Martens, Olson & Bear, LLP

(57) ABSTRACT

The present disclosure provides a system for controlling the climate of a vehicle. The system includes a thermoelectric module and a heat exchanger. The thermoelectric module includes thermoelectric elements powered by electric energy. The thermoelectric elements emit or absorb heat energy based on the polarity of the electrical energy provided. The thermoelectric module and the heat exchanger heat or cool the air flow provided to the cabin of the vehicle.

12 Claims, 2 Drawing Sheets

(56) References Cited

U.S. PATENT DOCUMENTS

| | | | |
|---|---|---|---|
| 2,499,901 A | 3/1950 | Brown, Jr. |
| 2,944,404 A | 7/1960 | Fritts |
| 2,949,014 A | 8/1960 | Belton, Jr. et al. |
| 2,984,077 A | 5/1961 | Gaskill |
| 2,997,514 A | 8/1961 | Roeder, Jr. |
| 3,085,405 A | 4/1963 | Frantti |
| 3,125,860 A | 3/1964 | Reich |
| 3,136,577 A | 6/1964 | Richard |
| 3,137,142 A | 6/1964 | Venema |
| 3,138,934 A | 6/1964 | Roane |
| 3,196,620 A | 7/1965 | Elfving et al. |
| 3,212,275 A | 10/1965 | Tillman, Jr. |
| 3,213,630 A | 10/1965 | Mole |
| 3,236,056 A * | 2/1966 | Phillips ............... B60H 1/00478 |
| | | | 165/202 |
| 3,252,504 A * | 5/1966 | Newton ................... F24F 3/06 |
| | | | 165/205 |
| 3,391,727 A | 7/1968 | Armenag Topouszian |
| 3,527,621 A | 9/1970 | Newton |
| 3,599,437 A | 8/1971 | Panas |
| 3,635,037 A | 1/1972 | Hubert |
| 3,681,929 A | 8/1972 | Schering |
| 3,779,307 A | 12/1973 | Weiss et al. |
| 3,817,043 A | 6/1974 | Zoleta |
| 3,885,126 A | 5/1975 | Sugiyama et al. |
| 4,038,831 A | 8/1977 | Gaudel et al. |
| 4,051,691 A | 10/1977 | Dawkins |
| 4,065,936 A | 1/1978 | Fenton et al. |
| 4,193,271 A | 3/1980 | Honigsbaum |
| 4,280,330 A * | 7/1981 | Harris ................ B60H 1/00478 |
| | | | 123/198 R |
| 4,448,157 A | 5/1984 | Eckstein et al. |
| 4,494,380 A | 1/1985 | Cross |
| 4,531,379 A | 7/1985 | Diefenthaler, Jr. |
| 4,658,599 A | 4/1987 | Kajiwara |
| 4,665,707 A | 5/1987 | Hamilton |
| 4,665,971 A | 5/1987 | Sakurai |
| 4,707,995 A | 11/1987 | Assaf |
| 4,753,682 A | 6/1988 | Cantoni |
| 4,823,554 A | 4/1989 | Trachtenberg et al. |
| 4,848,090 A | 7/1989 | Peters |
| 4,858,069 A | 8/1989 | Hughes |
| 4,905,475 A | 3/1990 | Tuomi |
| 4,907,060 A | 3/1990 | Nelson et al. |
| 4,922,721 A | 5/1990 | Robertson et al. |
| 4,922,998 A | 5/1990 | Carr |
| 4,947,735 A | 8/1990 | Guillemin |
| 4,988,847 A | 1/1991 | Argos et al. |
| 5,029,446 A | 7/1991 | Suzuki |
| 5,038,569 A | 8/1991 | Shirota et al. |
| 5,042,566 A | 8/1991 | Hildebrand |
| 5,092,129 A | 3/1992 | Bayes et al. |
| 5,097,829 A | 3/1992 | Quisenberry |
| 5,111,664 A | 5/1992 | Yang |
| 5,119,640 A | 6/1992 | Conrad |
| 5,167,129 A | 12/1992 | Akasaka |
| 5,193,347 A | 3/1993 | Apisdorf |
| 5,198,930 A | 3/1993 | Muratomi |
| 5,232,516 A | 8/1993 | Hed |
| 5,269,146 A | 12/1993 | Kerner |
| 5,291,960 A | 3/1994 | Brandenburg et al. |
| 5,300,197 A | 4/1994 | Mitani et al. |
| 5,303,771 A | 4/1994 | Des Champs |
| 5,316,078 A | 5/1994 | Cesaroni |
| 5,385,020 A | 1/1995 | Gwilliam et al. |
| 5,386,823 A | 2/1995 | Chen |
| 5,407,130 A | 4/1995 | Uyeki et al. |
| 5,431,021 A | 7/1995 | Gwilliam et al. |
| 5,448,891 A | 9/1995 | Nakagiri et al. |
| 5,450,894 A | 9/1995 | Inoue et al. |
| 5,483,807 A | 1/1996 | Abersfelder et al. |
| 5,497,625 A | 3/1996 | Manz et al. |
| 5,499,504 A | 3/1996 | Mill et al. |
| 5,549,153 A | 8/1996 | Baruschke et al. |
| 5,576,512 A | 11/1996 | Doke |
| 5,592,363 A | 1/1997 | Atarashi et al. |
| 5,605,047 A | 2/1997 | Park et al. |
| 5,626,021 A * | 5/1997 | Karunasiri ............... A47C 7/74 |
| | | | 236/49.3 |
| 5,653,111 A | 8/1997 | Attey et al. |
| 5,673,964 A | 10/1997 | Roan et al. |
| 5,694,770 A | 12/1997 | Bruck et al. |
| 5,722,249 A | 3/1998 | Miller, Jr. |
| 5,725,048 A | 3/1998 | Burk et al. |
| 5,802,856 A | 9/1998 | Schaper et al. |
| 5,816,236 A | 10/1998 | Moroi et al. |
| 5,878,950 A * | 3/1999 | Faccone ............... B60H 1/2206 |
| | | | 236/91 F |
| 5,890,371 A * | 4/1999 | Rajasubramanian . F24F 5/0042 |
| | | | 165/104.21 |
| 5,899,086 A | 5/1999 | Noda et al. |
| 5,901,572 A | 5/1999 | Peiffer et al. |
| RE36,242 E | 6/1999 | Apisdorf |
| 5,918,930 A | 7/1999 | Kawai et al. |
| 5,921,088 A | 7/1999 | Imaizumi et al. |
| 5,955,772 A | 9/1999 | Shakouri et al. |
| 5,964,092 A | 10/1999 | Tozuka et al. |
| 5,966,941 A | 10/1999 | Ghoshal |
| 5,975,856 A | 11/1999 | Welle |
| 5,977,785 A | 11/1999 | Burward-Hoy |
| 5,987,890 A | 11/1999 | Chiu et al. |
| 6,002,105 A | 12/1999 | Tamada |
| 6,050,326 A | 4/2000 | Evans |
| 6,059,198 A | 5/2000 | Moroi et al. |
| 6,082,445 A | 7/2000 | Dugan |
| 6,084,172 A | 7/2000 | Kishi et al. |
| 6,105,659 A | 8/2000 | Pocol et al. |
| 6,119,463 A | 9/2000 | Bell |
| 6,138,749 A | 10/2000 | Kawai et al. |
| 6,158,225 A | 12/2000 | Muto et al. |
| 6,205,802 B1 | 3/2001 | Drucker et al. |
| 6,205,805 B1 | 3/2001 | Takahashi et al. |
| 6,213,198 B1 | 4/2001 | Shikata et al. |
| 6,223,539 B1 | 5/2001 | Bell |
| 6,270,015 B1 | 8/2001 | Hirota |
| 6,282,907 B1 | 9/2001 | Ghoshal |
| 6,293,107 B1 | 9/2001 | Kitagawa |
| 6,324,860 B1 | 12/2001 | Maeda et al. |
| 6,334,311 B1 | 1/2002 | Kim et al. |
| 6,346,668 B1 | 2/2002 | McGrew |
| 6,347,521 B1 | 2/2002 | Kadotani et al. |
| 6,366,832 B2 | 4/2002 | Lomonaco et al. |
| 6,393,842 B2 | 5/2002 | Kim |
| 6,401,462 B1 | 6/2002 | Bielinski |
| 6,412,287 B1 | 7/2002 | Hughes et al. |
| 6,431,257 B1 | 8/2002 | Sano et al. |
| 6,438,964 B1 | 8/2002 | Giblin |
| 6,453,993 B1 | 9/2002 | Bujak, Jr. |
| 6,457,324 B2 | 10/2002 | Zeigler et al. |
| 6,464,027 B1 | 10/2002 | Dage et al. |
| 6,474,073 B1 | 11/2002 | Uetsuji et al. |
| 6,474,081 B1 | 11/2002 | Feuerecker |
| 6,481,213 B2 | 11/2002 | Carr et al. |
| 6,510,696 B2 | 1/2003 | Guttman et al. |
| 6,530,231 B1 | 3/2003 | Nagy et al. |
| 6,530,842 B1 | 3/2003 | Wells et al. |
| 6,530,920 B1 | 3/2003 | Whitcroft et al. |
| 6,539,725 B2 | 4/2003 | Bell |
| 6,539,729 B2 | 4/2003 | Tupis et al. |
| 6,560,968 B2 | 5/2003 | Ko |
| 6,569,550 B2 | 5/2003 | Khelifa |
| RE38,128 E | 6/2003 | Gallup et al. |
| 6,598,403 B1 | 7/2003 | Ghoshal |
| 6,606,877 B2 * | 8/2003 | Tomita .................. B60H 1/005 |
| | | | 165/10 |
| 6,607,142 B1 | 8/2003 | Boggs et al. |
| 6,640,889 B1 | 11/2003 | Harte et al. |
| 6,653,002 B1 | 11/2003 | Parise |
| 6,682,844 B2 | 1/2004 | Genc |
| 6,700,052 B2 | 3/2004 | Bell |
| 6,722,139 B2 | 4/2004 | Moon et al. |
| 6,732,534 B2 | 5/2004 | Spry |
| 6,779,348 B2 | 8/2004 | Taban |
| 6,807,811 B2 | 10/2004 | Lee |

(56) References Cited

U.S. PATENT DOCUMENTS

| | | |
|---|---|---|
| 6,862,892 B1 | 3/2005 | Meyer et al. |
| 6,883,602 B2 | 4/2005 | Drucker |
| 6,886,356 B2 | 5/2005 | Kubo et al. |
| 6,896,047 B2 | 5/2005 | Currle et al. |
| 6,907,739 B2 | 6/2005 | Bell |
| 6,910,345 B2 | 6/2005 | Horstmann et al. |
| 6,915,641 B2 | 7/2005 | Harvie |
| 6,959,555 B2 | 11/2005 | Bell |
| 6,962,195 B2 | 11/2005 | Smith et al. |
| 6,973,799 B2 | 12/2005 | Kuehl et al. |
| 6,986,247 B1 | 1/2006 | Parise |
| 7,007,491 B2 | 3/2006 | Grimm et al. |
| 7,074,122 B2 | 7/2006 | Haupt et al. |
| 7,089,756 B2 | 8/2006 | Hu |
| 7,134,288 B2 | 11/2006 | Crippen et al. |
| 7,171,955 B2 | 2/2007 | Perkins |
| 7,246,496 B2 | 7/2007 | Goenka et al. |
| 7,310,953 B2 | 12/2007 | Pham et al. |
| 7,363,766 B2 | 4/2008 | Eisenhour |
| 7,380,586 B2 | 6/2008 | Gawthrop |
| 7,416,138 B2 | 8/2008 | Ellison et al. |
| 7,426,835 B2 | 9/2008 | Bell |
| 7,650,757 B2 | 1/2010 | Bhatti |
| 7,743,614 B2 | 6/2010 | Goenka et al. |
| 7,779,639 B2 | 8/2010 | Goenka |
| 7,784,289 B2 | 8/2010 | Scherer et al. |
| 7,788,933 B2 | 9/2010 | Goenka |
| 7,870,892 B2 | 1/2011 | Gawthrop |
| 7,905,278 B2 | 3/2011 | Sato et al. |
| 7,926,293 B2 | 4/2011 | Bell |
| 8,039,726 B2 | 10/2011 | Zhang et al. |
| 8,069,674 B2 | 12/2011 | Bell |
| 8,104,294 B2 | 1/2012 | Reeve |
| 8,261,868 B2 | 9/2012 | Goenka et al. |
| 8,359,871 B2 | 1/2013 | Woods et al. |
| 8,408,012 B2 * | 4/2013 | Goenka ............... B60H 1/00478 62/3.3 |
| 8,490,412 B2 | 7/2013 | Bell et al. |
| 8,495,884 B2 | 7/2013 | Bell et al. |
| 8,613,200 B2 | 12/2013 | LaGrandeur et al. |
| 8,631,659 B2 | 1/2014 | Goenka |
| 8,640,466 B2 | 2/2014 | Bell et al. |
| 8,783,397 B2 | 7/2014 | Goenka et al. |
| 8,915,091 B2 | 12/2014 | Goenka |
| 8,974,942 B2 | 3/2015 | Bell et al. |
| 2002/0095943 A1 | 7/2002 | Hatakeyama et al. |
| 2002/0173264 A1 * | 11/2002 | Ottman ............... B60H 1/00007 454/142 |
| 2003/0140636 A1 | 7/2003 | Van Winkle |
| 2003/0145605 A1 | 8/2003 | Moon et al. |
| 2004/0025516 A1 | 2/2004 | Van Winkle |
| 2004/0050076 A1 | 3/2004 | Palfy et al. |
| 2004/0093889 A1 | 5/2004 | Bureau et al. |
| 2004/0098991 A1 | 5/2004 | Heyes |
| 2004/0237541 A1 | 12/2004 | Murphy |
| 2005/0000473 A1 | 1/2005 | Ap et al. |
| 2005/0011199 A1 | 1/2005 | Grisham et al. |
| 2005/0061497 A1 | 3/2005 | Amaral |
| 2005/0067862 A1 | 3/2005 | Iqbal et al. |
| 2005/0139692 A1 | 6/2005 | Yamamoto |
| 2005/0178128 A1 | 8/2005 | Harwood et al. |
| 2005/0257531 A1 | 11/2005 | Kadle et al. |
| 2005/0257545 A1 | 11/2005 | Ziehr et al. |
| 2005/0268621 A1 * | 12/2005 | Kadle ............... B60H 1/00285 62/3.2 |
| 2005/0278863 A1 | 12/2005 | Bahash et al. |
| 2006/0005548 A1 | 1/2006 | Ruckstuhl |
| 2006/0011152 A1 | 1/2006 | Hayes |
| 2006/0059933 A1 | 3/2006 | Axakov et al. |
| 2006/0075758 A1 | 4/2006 | Rice et al. |
| 2006/0102335 A1 | 5/2006 | Fujiki et al. |
| 2006/0124165 A1 | 6/2006 | Bierschenk et al. |
| 2006/0130490 A1 | 6/2006 | Petrovski |
| 2006/0137358 A1 | 6/2006 | Feher |
| 2006/0150657 A1 | 7/2006 | Spurgeon et al. |
| 2006/0174633 A1 | 8/2006 | Beckley |
| 2006/0188418 A1 | 8/2006 | Park et al. |
| 2006/0254284 A1 | 11/2006 | Ito et al. |
| 2006/0254285 A1 | 11/2006 | Lin |
| 2007/0000255 A1 | 1/2007 | Elliot et al. |
| 2007/0056295 A1 | 3/2007 | De Vilbiss |
| 2007/0214799 A1 | 9/2007 | Goenka |
| 2007/0272290 A1 | 11/2007 | Sims et al. |
| 2008/0017362 A1 | 1/2008 | Kwon et al. |
| 2008/0307796 A1 | 12/2008 | Bell et al. |
| 2009/0000310 A1 | 1/2009 | Bell et al. |
| 2009/0118869 A1 | 5/2009 | Cauchy et al. |
| 2010/0052374 A1 | 3/2010 | Bell et al. |
| 2010/0101238 A1 | 4/2010 | LaGrandeur et al. |
| 2010/0101239 A1 | 4/2010 | LaGrandeur et al. |
| 2010/0112419 A1 | 5/2010 | Jang et al. |
| 2010/0155018 A1 | 6/2010 | Goenka et al. |
| 2010/0287952 A1 | 11/2010 | Goenka |
| 2010/0313576 A1 | 12/2010 | Goenka |
| 2011/0107773 A1 | 5/2011 | Gawthrop |
| 2011/0236731 A1 | 9/2011 | Bell et al. |
| 2012/0266608 A1 | 10/2012 | Kadle et al. |
| 2013/0059190 A1 | 3/2013 | Kossakovski et al. |
| 2013/0174579 A1 | 7/2013 | Goenka et al. |
| 2013/0192271 A1 | 8/2013 | Barnhart et al. |
| 2013/0192272 A1 | 8/2013 | Ranalli et al. |
| 2013/0317728 A1 | 11/2013 | Hall et al. |
| 2014/0060086 A1 | 3/2014 | Ranalli |
| 2014/0325997 A1 | 11/2014 | Bell et al. |
| 2015/0298524 A1 | 10/2015 | Goenka |

FOREIGN PATENT DOCUMENTS

| | | |
|---|---|---|
| CN | 101508236 A | 8/2009 |
| DE | 13 01 454 | 8/1969 |
| DE | 2319155 | 10/1974 |
| DE | 43 29 816 | 3/1994 |
| DE | 42 38 364 | 5/1994 |
| DE | 197 30 678 | 1/1999 |
| DE | 198 29 440 A1 | 1/2000 |
| DE | 199 51 224 | 5/2001 |
| DE | 20 105 487 | 10/2001 |
| DE | 10 2009 003 737 | 10/2010 |
| EP | 0 389 407 | 9/1990 |
| EP | 0 545 021 | 6/1993 |
| EP | 0 791 497 | 8/1997 |
| EP | 0 834 421 | 4/1998 |
| EP | 1 038 701 | 9/2000 |
| EP | 1641067 A1 | 3/2006 |
| EP | 1 932 695 A1 | 6/2008 |
| FR | 2806666 | 9/2001 |
| GB | 231 192 A | 5/1926 |
| GB | 1 040 485 | 8/1966 |
| GB | 2 267 338 | 12/1993 |
| GB | 2 333 352 | 7/1999 |
| JP | 39-27735 | 12/1964 |
| JP | 56-18231 | 2/1981 |
| JP | 01 131830 A | 5/1989 |
| JP | 01 200122 | 8/1989 |
| JP | 01 281344 | 11/1989 |
| JP | 04 103925 | 4/1992 |
| JP | 4-165234 | 6/1992 |
| JP | 05-037521 U | 5/1993 |
| JP | 6-024235 | 2/1994 |
| JP | 06-135218 | 5/1994 |
| JP | 07-089334 | 4/1995 |
| JP | 07-54189 | 6/1995 |
| JP | 07-253224 | 10/1995 |
| JP | 08-316388 | 11/1996 |
| JP | 09042801 | 2/1997 |
| JP | 09-092761 | 4/1997 |
| JP | 09-254630 | 9/1997 |
| JP | 9-276076 | 10/1997 |
| JP | 10035268 | 2/1998 |
| JP | 11-042933 | 2/1999 |
| JP | 11-301254 | 11/1999 |
| JP | 11-342731 | 12/1999 |
| JP | 11342731 A * | 12/1999 |
| JP | 2000 130883 A1 | 5/2000 |

(56) References Cited

FOREIGN PATENT DOCUMENTS

| | | |
|---|---|---|
| JP | 2000-161721 | 6/2000 |
| JP | 2000-185542 | 7/2000 |
| JP | 2000-274788 | 10/2000 |
| JP | 2000-274871 A | 10/2000 |
| JP | 2000-274874 | 10/2000 |
| JP | 2000-318434 | 11/2000 |
| JP | 2000/335230 | 12/2000 |
| JP | 2002-13758 | 1/2002 |
| JP | 2002059736 A | 2/2002 |
| JP | 2003-237357 | 8/2003 |
| JP | 2004 050874 | 2/2004 |
| JP | 2005 212564 | 8/2005 |
| JP | 2005-302851 | 10/2005 |
| JP | 2006-001530 | 1/2006 |
| JP | 2006 015965 | 1/2006 |
| JP | 2007-161110 | 6/2007 |
| JP | 2008-094366 | 4/2008 |
| KR | 2001 111646 | 12/2001 |
| KR | 10-2002-0057600 | 7/2002 |
| KR | 2008-0008875 | 1/2008 |
| KR | 10-2011-0013876 | 2/2011 |
| LU | 66619 | 2/1973 |
| SE | 337 227 | 5/1971 |
| SU | 184886 A | 7/1966 |
| SU | 1196627 A | 12/1985 |
| WO | WO 94/20801 | 9/1994 |
| WO | WO 95/01500 | 1/1995 |
| WO | WO 95/14899 | 6/1995 |
| WO | WO 96/05475 | 2/1996 |
| WO | WO 97/47930 | 12/1997 |
| WO | WO 99/09360 | 2/1999 |
| WO | WO 99/10191 | 3/1999 |
| WO | WO 99/58907 | 11/1999 |
| WO | WO 02/00458 | 1/2002 |
| WO | WO 03/014634 | 2/2003 |
| WO | WO 2005/023571 | 3/2005 |
| WO | WO 2005/063567 | 7/2005 |
| WO | WO 2006/037178 | 4/2006 |
| WO | WO 2006/064432 | 6/2006 |
| WO | WO 2007/001289 | 1/2007 |
| WO | WO 2007/002891 | 1/2007 |
| WO | WO 2007/021273 | 2/2007 |
| WO | WO 2008/147305 | 4/2008 |
| WO | WO 2008/091293 | 7/2008 |
| WO | WO 2008/123663 | 10/2008 |
| WO | WO 2008/148042 | 12/2008 |
| WO | WO 2010/048575 | 4/2010 |

OTHER PUBLICATIONS

International Search Report and Written Opinion for application No. PCT/US2013/034690, mailed on Jul. 2, 2013, 7 pages.

Lofy, John et al., "Thermoelectrics for Environmental Control Automobiles," 21st International Conference on Thermoelectronics, 2002, p. 471-476.

Stockholm, John G.: "Large-Scale Cooling: Integrated Thermoelectric Element Technology," CRC Handbook of Thermoelectrics, Chapter 53, pp. 657-666. 0-8493-0146, Jul. 1995.

* cited by examiner

CLIMATE CONTROL SYSTEM FOR VEHICLES USING THERMOELECTRIC DEVICES

INCORPORATION BY REFERENCE TO ANY PRIORITY APPLICATIONS

Any and all applications for which a foreign or domestic priority claim are identified in the Application Data Sheet as filed with the present application, are incorporated by reference, and made a part of this specification.

BACKGROUND

1. Field

The present disclosure generally relates to a climate control system for vehicles.

2. Description of Related Art

Hybrid vehicles, vehicles driven by both an internal combustion engine and an electric motor, are becoming more well known. For hybrid vehicles to increasingly become commercially adopted, these vehicles need to provide the same features and comforts as current traditional vehicles. In order to achieve maximum efficiency, hybrid vehicles employ a start/stop strategy, meaning the vehicle's internal combustion engine shuts down to conserve energy during normal idle conditions. During this period, it is still important to maintain comfort in the vehicle. In order to keep the cabin comfortable during cool temperatures, coolant is generally circulated through the heater core to provide cabin heat. However, in warm weather climates, the only method for keeping the cabin cool is by running the internal combustion engine to drive the compressor of an air conditioning system. Vehicles on the road today with such start/stop strategies allow the consumer to keep the engine running, while stopped at idle conditions, to maintain cabin comfort. Unfortunately, running the engine during vehicle idle periods eliminates the fuel economy savings obtained by shutting off the engine during idle operation.

As seen from the above, it is apparent that there exists a need for an improved climate control system for vehicles.

In satisfying the above need, as well as overcoming the enumerated drawbacks and other limitations of the related art, the present disclosure provides a system for controlling the climate within the passenger cabin of a vehicle. The system includes a thermoelectric module, a heat exchanger, a pump, and a valve.

SUMMARY

The thermoelectric module includes thermoelectric elements, powered by electric energy, that emit or absorb heat energy based on the polarity of the electrical energy provided. A tube containing coolant runs proximate to the thermoelectric elements. To aid in the transfer of heat energy, a blower is provided to generate an air flow across the thermoelectric elements and the tube. The coolant is provided from the thermoelectric module to a heat exchanger that heats or cools the air flow provided to the cabin of the vehicle. The pump pressurizes the coolant flow through the tube and coolant lines, and in a cooling mode, the valve is configured to selectively bypass the engine coolant system of the vehicle.

In another aspect of the disclosed embodiment, the system includes a heater core and an evaporator in fluid communication with the heat exchanger. The air flow to the passenger cabin may be supplementally heated by the heater core or supplementally cooled by the evaporator.

In another aspect of the disclosed embodiment, the system includes a controller in electrical communication with the thermoelectric module. The controller is configured to switch the polarity of electrical energy supplied to the thermoelectric module to alternatively heat or cool the coolant. In addition, the controller is configured to direct electrical energy generated by a regenerative braking system to the thermoelectric module for use in controlling the interior climate of the vehicle.

Further objects, features and advantages of the embodiments disclosed herein will become readily apparent to persons skilled in the art after a review of the following description, with reference to the drawings and claims that are appended to and form a part of this specification.

DETAILED DESCRIPTION OF PREFERRED EMBODIMENTS

Figure 1:
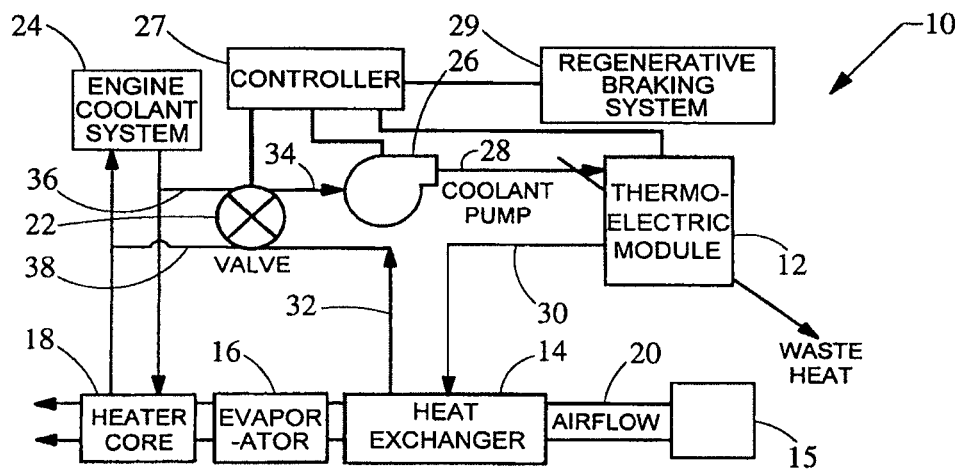
FIG. 1 is a block diagram of an embodiment of a climate control system in a supplemental cooling mode.

Referring now to FIG. 1, an embodiment of a climate control system is illustrated and designated at 10. The system 10 can include a thermoelectric module 12, a heat exchanger 14, an evaporator 16, a heater core 18, a valve 22, a coolant pump 26, and a controller 27. As further discussed below, the thermoelectric module 12, in conjunction with the heat exchanger 14, allows the system 10 to provide heating or cooling with the internal combustion engine shut off, or alternatively, to provide supplemental heating or cooling while the internal combustion engine is running.

Figure 2:
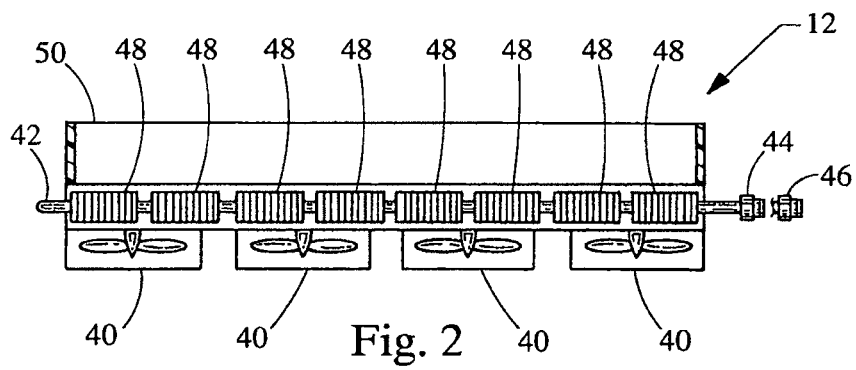
FIG. 2 is a sectional front view of an embodiment of a thermoelectric module.

Now referring to FIG. 2, a sectional view of the thermoelectric module 12 is provided. The thermoelectric module 12 includes a series of thermoelectric elements 48 that generate a temperature change from electrical energy. If the electrical energy is provided in one polarity, the thermoelectric elements 48 will generate heat energy causing a rise in the ambient temperature around the thermoelectric elements 48. Alternatively, if electrical energy is provided to the thermoelectric elements 48 in an opposite polarity, the thermoelectric elements 48 will absorb heat energy, thereby cooling the ambient temperature around the thermoelectric elements 48. To transfer heating or cooling from the thermoelectric elements 48, a heat transfer medium, namely coolant, flows through a coolant tube 42 located proximate to the thermoelectric elements 48. To aid in this heat transfer to the coolant, one or more blowers 40 generate an air flow across the thermoelectric elements 48 and the coolant tube 42. In addition, an air scoop 50 may be provided to direct air leaving or entering the thermoelectric module 12. The coolant is provided to the thermoelectric elements 48 circulates through an inlet connection 44 to the rest of the system through an outlet connection 46, thereby enabling the transferring of the temperature change generated by the thermoelectric elements 48.

Referring again to FIG. 1, the thermoelectric module 12 is in fluid communication, via the coolant, with the heat exchanger 14 along line 30. The blower 15 creates an air flow 20 across the heat exchanger 14, and the air flow 20 extracts heating or cooling from the coolant supplied by the thermoelectric module 12 thereby altering the temperature of the air flow 20. In a heating mode, the thermoelectric module 12 provides heated coolant thereby heating the air flow 20. Alternatively in a cooling mode, the thermoelectric module 12 provides cooled coolant, thereby cooling the air flow 20. From the heat exchanger 14 the air flow 20 is communicated over heat transfer surfaces of both the evaporator 16 and heater core 18.

The coolant exits the heat exchanger 14 along line 32 and is provided to valve 22 that selectively allows the coolant to flow along line 38 into the engine coolant system 24 or back to the coolant pump 26. Generally, the engine coolant system 24 will heat the coolant and return a portion of the coolant along line 36 to the heater core 18 and to the valve 22 which passes it back to the coolant pump 26. Alternatively, the valve 22 can solely direct the coolant from line 32 directly to line 34, bypassing the engine coolant system 24. This latter flow circuit is particularly beneficial in the cooling mode of the system 10.

The controller 27 allows the system to work in multiple heating and cooling modes. For example, the controller 27 can switch the polarity of the electrical energy provided to the thermoelectric module, thereby heating the coolant with one polarity, and cooling the coolant with the opposite polarity. In addition, the controller 27 can manipulate the valve 22 to bypass the engine cooling system 24 in cooling mode, thereby isolating the coolant from the heat generated by the engine in the engine coolant system 24.

The controller 27 is also connected to a regenerative braking system 29. The regenerative braking system 29 generates electrical energy from the kinetic energy of the vehicle as the vehicle is slowed down. The controller 27 can direct the energy from the regenerative braking system 29 to an energy storage device, a battery, (not shown) or directly to the thermoelectric module 12, providing an ample source of power to adjust the climate of the vehicle. If provided directly to the thermoelectric module 12, the controller 27 can change the polarity of the electrical energy provided from the regenerative braking system 29 allowing the energy to be used by the thermoelectric module 12 in both heating and cooling modes.

Figure 3:
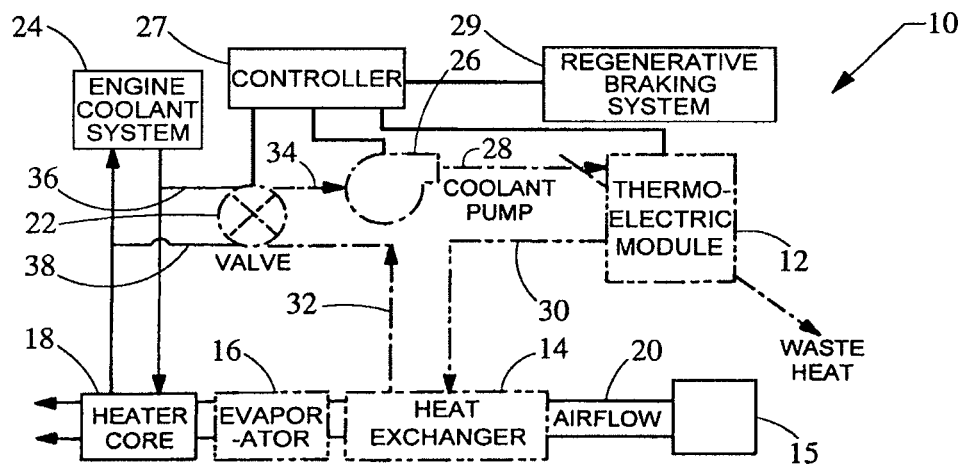
FIG. 3 is a block diagram of an embodiment of a climate control system in a supplemental cooling mode.

Now referring to FIG. 3, the system 10 is shown in a supplemental cooling mode while the internal combustion engine is running. During "engine on" supplemental cooling, the thermoelectric module 12 is used in conjunction with the evaporator 16 to cool the passenger cabin of the vehicle. The combined use of the thermoelectric module 12 and the evaporator 16 provides a faster time to comfort. As illustrated in FIG. 3, the lines with a single small dash convey heated coolant from the heat exchanger 14 while the lines with two smaller dashes convey cooled coolant to the heat exchanger 14.

In the "engine on" supplemental cooling mode, the coolant flows through the thermoelectric module 12, where heat is removed from the coolant, and thereafter along line 30 to the heat exchanger 14. The heat exchanger 14 cools the air flow 20 which is then provided to the evaporator 16 for additional cooling before it flows to the passenger cabin of the vehicle. From the heat exchanger 14, coolant flows along line 32 to the valve 22, which is manipulated by the controller 27 to bypass the engine coolant system 24 thereby isolating the coolant from the heat generated by the engine. From the valve 22 the coolant flows along line 34 to the coolant pump 26 where the coolant flow is pressurized then provided back to the thermoelectric module 12 along line 28. In this mode of operation, the thermoelectric module 12 operates for the first couple minutes to quickly pull down the temperature of the air flow 20. If the temperature of the air coming into the heat exchanger 14 is less than the temperature of the air flowing into the thermoelectric module 12, the thermoelectric module 12 and pump 26 are not operated thereby conserving vehicle energy.

Figure 4:
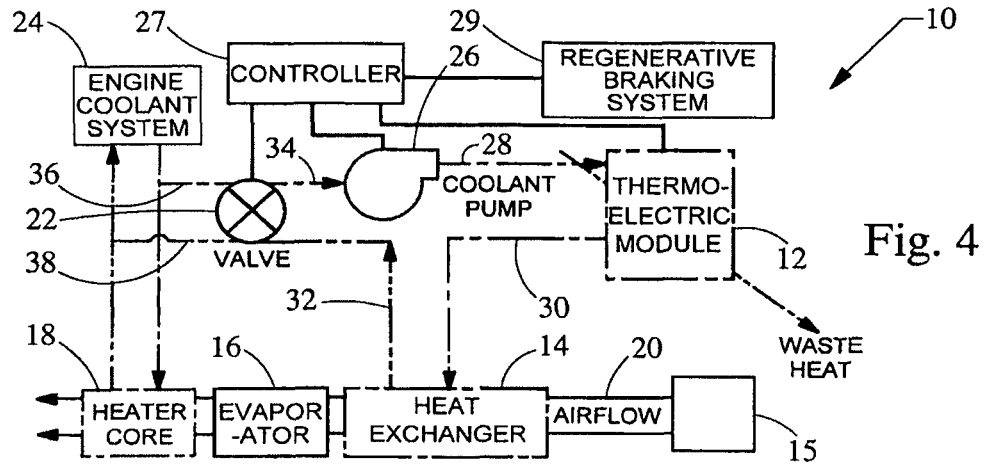
FIG. 4 is a block diagram of an embodiment of a climate control system in a supplemental heating mode.

The system 10 in "engine on" supplemental heating mode is seen in FIG. 4. In the "engine on" supplemental heating mode, the thermoelectric module 12 is used in conjunction with the heater core 18. Using the thermoelectric module 12 in combination with the heater core 18 provides a faster time to comfort. Warm coolant from the engine is pumped through the thermoelectric module 12 where further heat is added. The coolant flows from the thermoelectric module 12 along line 30 to the heat exchanger 14, upstream of the heater core 18. The heat exchanger 14 first heats the air flow 20 that is received by the heater core 18. The heater core 18 emits heat from the engine coolant system 24 to further heat the air flow 20 before it is provided to the passenger cabin of the vehicle.

Coolant from the heat exchanger 14 is passed along line 32 to the valve 22, which in the supplemental "engine on" heating mode, allows coolant to return to the engine coolant system along line 38. The engine coolant system 24 provides heat from the engine to the coolant, some of which then flows to the heater core 18 and along line 36 to the valve 22. From the valve 22, the coolant flows along line 34 through the coolant pump 26 and returns along line 28 to the thermoelectric module 12. If the engine coolant system 24 provides sufficient means for pumping the coolant through the system, the coolant pump 26 is deactivated in this mode. Preferably, the thermoelectric module 12 operates for the first couple of minutes of heat up, and ceases to operate when the temperature of the coolant from the engine alone reaches the desired temperature to provide proper passenger cabin heating.

Figure 5:
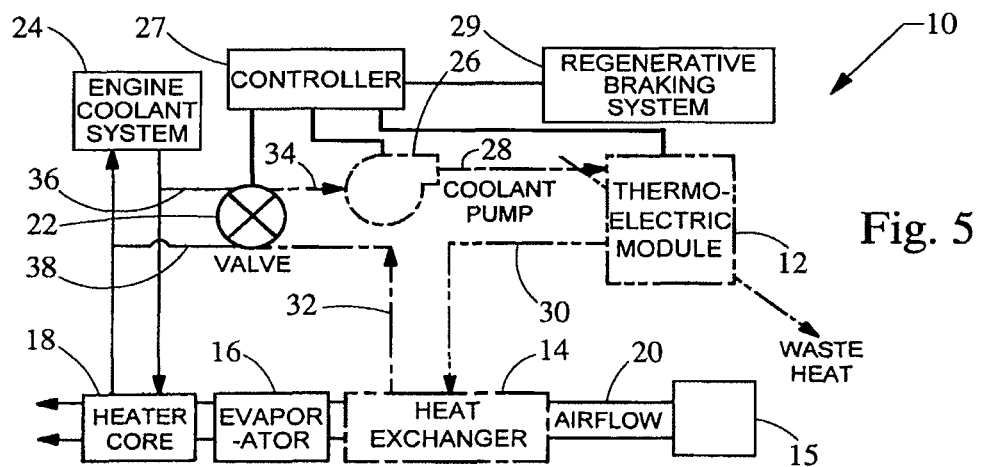
FIG. 5 is a block diagram of an embodiment of a climate control system, in an engine off cooling mode.

Now referring to FIG. 5, an "engine off" cooling mode is provided. The "engine off" cooling mode is used to maintain a comfortable cabin for a limited amount of time during an idle engine shutdown. In this mode, the evaporator is non-operative as the engine has been shut down. The cooling provided by the thermal inertia in the coolant and the thermoelectric module 12 allows the engine to shutdown and save fuel, while still allowing the passenger cabin to be cooled.

Coolant flows through the thermoelectric module 12 where heat is removed from the coolant. From the thermoelectric module 12, the coolant flows along line 30 to the heat exchanger 14. Heat is absorbed by the coolant from the air flow 20 in the heat exchanger 14. The coolant flows from the heat exchanger 14 along line 32 to the valve 22. Manipulated by the controller 27 to bypass the engine coolant system 14, the valve 22 isolates the coolant from the engine heat. The coolant flows from the valve 22 along line 34 back to the coolant pump 26, which generates coolant flow by pressurizing the coolant in the lines. The coolant is then received back by thermoelectric module 12 along line 28, where heat is absorbed from the coolant again.

The controller 27 monitors vehicle speed and braking to predict if a stop is imminent. If a stop is predicted, regenerating braking energy from the regenerative braking system 29 is used by the thermoelectric module 12 to cool the coolant. During the stop, the thermoelectric module 12 continues to operate to maintain the cool coolant temperature as heat is added from the cabin.

Figure 6:
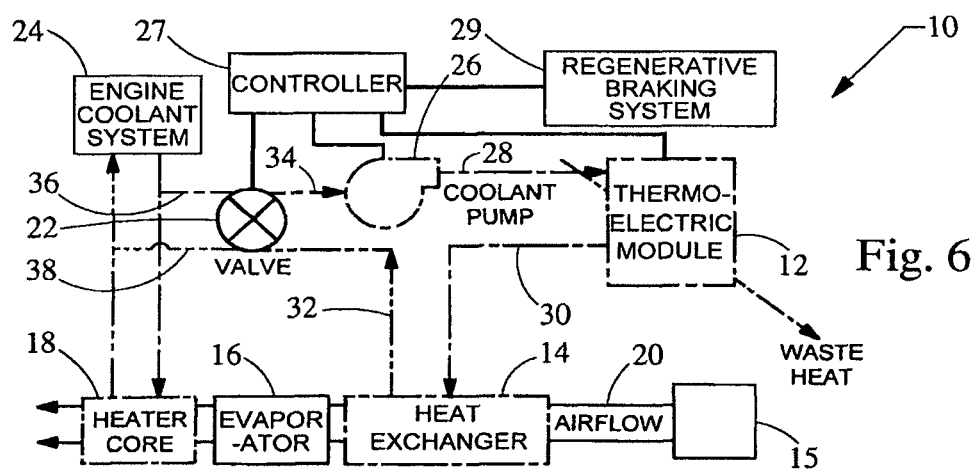
FIG. 6 is a block diagram of an embodiment of a climate control system in an engine off heating mode.

Now referring to FIG. 6, an "engine off" heating mode is schematically shown. The "engine off" heating mode is used to maintain a comfortable cabin temperature for a limited amount of time during an idle engine shutdown. The heat provided by the thermoelectric module 12, the thermal inertia in the coolant, and the thermal inertia in the engine block allows the system 10 to heat the cabin of the vehicle while allowing the engine to shutdown and save fuel.

In this mode of operation, warm coolant from the engine is pumped by the coolant pump 26 through the thermoelectric module 12 where heat is added. Coolant flows from the thermoelectric module 12 along line 30 to the heat exchanger 14. In the heat exchanger 14, heat is absorbed by the air flow 20 from the coolant. The heated air flow 20 is then provided to the heater core 18 where before the air flow 20 is provided to the cabin, further heat is absorbed from the coolant provided by the engine coolant system 24, The cooled coolant then flows from the heat exchanger 14 along line 32 to the valve 22, which is opened to provide the coolant to the engine coolant system 24. The engine coolant system 24 adds heat from the engine block to the coolant, which is returned to the heater core 18 and along line 36 to the valve 22 and the coolant pump 26. If the engine coolant system 24 has a pump to provide sufficient coolant pressure through the system 10, the coolant pump 26 is deactivated. From the pump 26, the coolant flows along line 28 back to the thermoelectric module 12 where further heat is added. In addition, the controller 27 monitors the vehicle speed and braking to predict if a stop is imminent. If a stop is predicted, the regenerative braking energy from the regenerative braking system 29 is used by the thermoelectric module 12 to heat the coolant. During the stop, the thermoelectric module 12 continues to operate and maintain the warm coolant temperature as heat is removed from the cabin.

As a person skilled in the art will readily appreciate, the above description is meant as an illustration of implementation of the principles this disclosure. This description is not intended to limit the scope or application of this disclosure in that the disclosure is susceptible to modification, variation and change, without departing from spirit of this disclosure.

What is claimed is:

1. A climate control system for heating or cooling a passenger cabin of a vehicle during heatup of an internal combustion engine of the vehicle, the system comprising:
    a coolant conduit configured to convey a coolant therein and selectively in thermal communication with an engine coolant system, wherein the engine coolant system is in thermal communication with an internal combustion engine of a vehicle;
    a heater core disposed in an air flow provided to a passenger cabin of the vehicle and in thermal communication with the engine coolant system;
    a thermoelectric module including a thermoelectric element and in thermal communication with the coolant conduit, the thermoelectric element configured to transfer thermal energy between the coolant conduit and a heat transfer medium;
    a heat exchanger disposed in the air flow and in thermal communication with the thermoelectric module; and
    a controller configured to operate the climate control system in a plurality of modes of operation, and wherein the plurality of modes of operation comprises:
        a heatup heating mode wherein the thermoelectric module is configured to heat the air flow by the thermoelectric elements transferring thermal energy from the heat transfer medium to the coolant while receiving electric current supplied in a first polarity and while the internal combustion engine is running; and
        a heating mode wherein the internal combustion engine is configured to heat the air flow while operation of the thermoelectric module is ceased and while the internal combustion engine is running,
    wherein, in the heatup heating mode, the thermoelectric module provides heat to the air flow while temperature of the coolant from thermal energy of the internal combustion engine alone has not reached a desired temperature to heat the passenger cabin.

2. The system of claim 1, wherein the climate control system, in the heatup heating mode, is configured to heat the passenger cabin of the vehicle with a faster time to comfort than heating the passenger cabin in the heating mode when the internal combustion engine is heating up.

3. The system of claim 1, wherein the heatup heating mode includes the internal combustion engine configured to heat the air flow while the thermoelectric element receives electric current supplied in the first polarity.

4. The system of claim 1, further comprising a valve coupled to the coolant conduit, wherein the valve is configured to move from a first position fluidly connecting the coolant conduit with the engine coolant system to a second position fluidly isolating the coolant conduit from the engine coolant system.

5. The system of claim 4, further comprising a pump configured to pressurize the coolant in the coolant conduit when the valve is in the second position.

6. The system of claim 1, wherein the plurality of modes of operation further comprises a supplemental cooling mode wherein the thermoelectric module is configured to cool the air flow by the thermoelectric element transferring thermal energy from the coolant to the heat transfer medium while receiving electric current supplied in a second polarity and while the internal combustion engine is running.

7. The system of claim 6, further comprising an evaporator operative by the internal combustion engine, the evaporator disposed in the air flow and configured to cool the air flow, wherein the thermoelectric module cooling the air flow in conjunction with the evaporator cooling the air flow provides a faster time to a desired temperature of the passenger cabin.

8. The system of claim 7, wherein the heat exchanger is upstream of the evaporator such that the heat exchanger cools the air flow before the evaporator cools the air flow.

9. The system of claim 1, wherein the heat exchanger is upstream of the heater core such that the heat exchanger heats the air flow before the heater core heats the air flow.

10. The system of claim 1, further comprising an air duct within which the heater core and the heat exchanger are located.

11. The system of claim 1, further comprising a regenerative braking system, wherein the controller is configured to direct electric current generated by the regenerative braking system to the thermoelectric module to generate a temperature change in the thermoelectric element.

12. The system of claim 1, wherein the controller is configured to switch operation of the climate control system from the heatup heating mode to the heating mode when temperature of the coolant from thermal energy of the internal combustion engine reaches the desired temperature to heat the passenger cabin.

* * * * *